(12) United States Patent
Wu et al.

(10) Patent No.: US 7,154,887 B2
(45) Date of Patent: Dec. 26, 2006

(54) NON-BLOCKING GROOMING SWITCH

(75) Inventors: Ephrem C. Wu, San Mateo, CA (US); Robert Hong, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 1067 days.

(21) Appl. No.: 10/114,398

(22) Filed: Apr. 1, 2002

(65) Prior Publication Data
US 2003/0021267 A1    Jan. 30, 2003

Related U.S. Application Data

(60) Provisional application No. 60/305,027, filed on Jul. 12, 2001.

(51) Int. Cl.
*H04L 12/28* (2006.01)
*H04Q 11/00* (2006.01)

(52) U.S. Cl. .................. 370/388; 370/375; 370/380; 370/389

(58) Field of Classification Search ........... 370/388, 370/360, 367, 370, 372, 375, 376, 377, 380, 370/386, 387, 390, 389
See application file for complete search history.

(56) References Cited

U.S. PATENT DOCUMENTS

| | | | |
|---|---|---|---|
| 3,735,049 A | 5/1973 | Buchner et al. | 179/15 AQ |
| 3,736,381 A | 5/1973 | Johnson et al. | 179/15 AQ |
| 3,925,621 A | 12/1975 | Collins et al. | 179/15 AL |
| 3,927,267 A | 12/1975 | Voyer et al. | 179/15 AT |
| 3,956,593 A | 5/1976 | Collins et al. | 179/15 AQ |
| 4,005,272 A | 1/1977 | Collins et al. | 179/15 AQ |
| 4,038,497 A | 7/1977 | Collins et al. | 179/15 AT |
| 4,797,589 A | 1/1989 | Collins | 370/63 |
| 4,967,405 A | 10/1990 | Upp et al. | 370/1 |
| 5,229,991 A * | 7/1993 | Turner | 370/389 |
| 5,493,565 A * | 2/1996 | Hanson et al. | 370/359 |
| 5,671,222 A * | 9/1997 | Chen et al. | 370/388 |
| 5,724,352 A * | 3/1998 | Cloonan et al. | 370/388 |
| 5,801,641 A * | 9/1998 | Yang et al. | 340/2.22 |
| 5,945,922 A | 8/1999 | Gao et al. | |

(Continued)

FOREIGN PATENT DOCUMENTS

WO    WO 96/08902    3/1996

OTHER PUBLICATIONS

Sezaki, K., et al, "The Cascade Clos Broadcast Switching Network—A New ATM Switching Network Which is Multiconnection Non-Blocking", *Proceedings of the International Switching Symposium* (ISS 1990); vol. 4, May 28, 1990-Jun. 1, 1990, pp. 143-147, XP000130910.

(Continued)

*Primary Examiner*—Hanh Nguyen
(74) *Attorney, Agent, or Firm*—Christopher P. Maiorana, P.C.

(57) ABSTRACT

A grooming switch comprises plural input ports for receiving multi-time-slot input signals and plural output ports for forwarding multi-time-slot output signals. At least five switching stages alternate between time switching and space switching. The first stage is connected to the input ports, and the last stage is connected to the output ports. Each intermediate stage is connected to two other stages. Collectively, these stages perform compact superconcentration of the input signals, copying and distribution of the compact superconcentrated signals, and unicast switching of the distributed signals to form the output signals, resulting in a grooming switch that is rearrangeably non-blocking for arbitrary multicast traffic.

41 Claims, 11 Drawing Sheets

U.S. PATENT DOCUMENTS

| | | | |
|---|---|---|---|
| 6,169,737 B1 | 1/2001 | Lindberg et al. | 370/376 |
| 6,215,773 B1 | 4/2001 | Karlsson | 370/244 |
| 6,240,063 B1 | 5/2001 | Suzuki | 370/217 |
| 6,870,831 B1* | 3/2005 | Hughes et al. | 370/352 |
| 2001/0053160 A1 | 12/2001 | Dally | |
| 2002/0146003 A1 | 10/2002 | Kam et al. | |

OTHER PUBLICATIONS

Ghaffar, A., et al., "Middle Stage Requirements and Blocking Probability Validation for Three Stage Broadcasting Clos Networks", *International Conference on Communications* (ICC 1996); vol. 2, Jun. 23-27, 1996, pp. 1050-1054, XP 000625932.

To, P., et al., "Generalized Non-blocking Copy Networks", *International Conference on Communications* (ICC 1997), Jun. 8-12, 1997, pp. 467-471, XP010227061.

Hwang, F. K., and Liaw, S.-C., "On Nonblocking Multicast Three-Stage Clos Networks," *IEEE/ACM Transactions on Networking*, 8(4): 535-539 (2000).

Beneš, V.E., "Rearrangeable Networks." In *Mathematical Theory of Connecting Networks and Telephonic Traffic*, pp. 82-135.

Clos, C., "A Study of Non-Blocking Switching Networks," *The Bell System Technical Journal*, 406-424 (1953).

Hui, J., "Multi-Point and Generalized Circuit Switching." In *Switching and Traffic Theory for Integrated Broadband Networks*, pp. 85-107.

"3.2 Gbps Cross Point Switches with Integrated Clock and Data Recovery," *VC3003 & VC3002*, Velio Communications, Inc., pp. 1-2 (May 21, 2001).

"72=72, 2.5Gb/s (STS-48/STS-48c/STM-16) with OC-192 Support SONET/SDH Grooming Switch," *VC2002*, Velio Communications, Inc., pp. 1-2 (Mar. 15, 2001).

"SONET Telecommunications Standard Primer." Tektronix, pp. 1-34 [as found on www.tektronix.com] (2001).

"SDH Telecommunications Standard Primer." Tektronix, pp. 1-38 [as found on www.tektronix.com] (2001).

\* cited by examiner

where

NON-BLOCKING GROOMING SWITCH

RELATED APPLICATION

This application claims the benefit of U.S. Provisional Application No. 60/305,027, filed on Jul. 12, 2001. The entire teachings of the above application are incorporated herein by reference.

BACKGROUND OF THE INVENTION

Telecommunications channels often carry traffic that is multiplexed from several sources. For example, a 2.488 Gb/s SONET STS-48 channel carries 48 51.84 Mb/s SONET STS-1 channels that are time multiplexed on a byte-by-byte basis. That is, the channel carries bytes 1.1, 2.1, 3.1, …, 48.1, 1.2, 2.2, 3.2, …, 48.2, 1.3, 2.3, 2.3, … where n.m denotes byte m of subchannel n. Details of the SONET format can be found in Ming-Chwan Chow, Understanding SONET/SDH: Standards & Applications, Andan Pub, ISBN 0965044823, 1995 and in ANSI Standard T1.105-1995, as well as Telcorida (tm) Technologies, Inc. GR-253-CORE, Issue Sep. 3, 2000, each of which is incorporated by reference in its entirety.

An STS-1 SONET frame is a repeating structure of 810 bytes arranged into 9 rows of 90 columns. The frame structure is transmitted in row-major order. That is, all 90-bytes of row 0 are transmitted, then all 90 bytes of row 1, and so on. At higher multiplexing rates, each byte of the STS-1 frame is replaced by a number of bytes, one from each of several multiplexed sources. For example, at STS-48, 48 bytes, one from each of 48 STS-1 subframes, are transmitted during each column interval. In this case, the order of transmission is to send all 48 subframe bytes for one column before moving on to the next column and to send all of the columns of a row before moving on to the next row.

A digital cross connect is a network element that accepts a number of multiplexed data channels, for example 72 STS-48 channels, and generates a number of multiplexed output channels where each output channel carries an arbitrary set of the subchannels from across all of the input ports. For example, one of the STS-48 output channels may contain STS-1 channels from different input channels in a different order than they were originally input.

An example of digital cross connect operation is shown in FIG. 1. The figure shows a cross connect 30 with two input ports and two output ports. Each of these ports contains four time slots. Input port 1 (the top input port) carries subchannels A, B, C, and D in its four slots and input port 2 (the bottom port) carries subchannels E, F, G, and H in its four time slots. Each time slot of each output port can select any time slot of any input port. For example, output port 1 (top) carries subchannels H, D, F, and A from 2.4, 1.4, 2.2, 1.1 where x.y denotes input port x, timeslot y. Input timeslots must be switched in both space and time. The first time slot of output port 1, for example must be switched in time from slot 4 to slot 1 and in space from port 2 to port 1. Also, some time slots may be duplicated (multicast) and others dropped. Subchannel A, for example, appears in output time slots 1.4 and 2.2 and subchannel G is dropped, appearing on no output time slot.

A digital cross connect can be implemented in a straightforward manner by demultiplexing each input port, switching all of the time slots of all of the input ports with a space switch, and then multiplexing each output port. This approach is illustrated in FIG. 2. The four time slots of input port 1 are demultiplexed (Demux) in demultiplexers 32 so that each is carried on a separate line. All of these demultiplexed lines are then switched by a space switch 34 to the appropriate output time slots. Finally, a set of multiplexers (Mux) 36 multiplexes the time slots of each output channel onto each output port. This approach is used, for example, in the systems described in U.S. Pat. Nos. 3,735,049 and 4,967,405.

The space-switch architecture for a digital cross connect as shown in FIG. 2 has the advantage that it is conceptually simple and strictly non-blocking for arbitrary unicast and multicast traffic. However, it results in space switches that are too large to be economically used for large cross connects. For example, a digital cross connect with P=72 ports and T=48 time slots requires a PT×PT (3456×3456) space switch with $P^2T^2 = 11,943,936$ cross points.

A more economical digital cross connect can be realized using a time-space-time (T-S-T) switch architecture as illustrated in FIG. 3. Here each input port is input to a time-slot interchanger (TSI) 38. A TSI switches a multiplexed input stream in time by interchanging the positions of the time slots. To switch time-slot i to time-slot j, for example, slot i is delayed by $T+j-i$ byte times. The multiplexed streams out of the input TSIs are then switched by a P×P space switch 40 that is reconfigured on each time slot. The outputs of this space switch are switched in time again by a set of output TSIs 42. This T-S-T architecture is employed, for example, by the systems described in U.S. Pat. Nos. 3,736,381 and 3,927,267.

An example of the operation of a T-S-T digital cross connect on the configuration of FIG. 2 is shown in FIG. 4. Here the TSI for input port 1 does not change the positions of its input time slots. The input TSI for port 2, however, reorders its time slots from E, F, G, H, to -, F, H, E. The G here is dropped as it is not used by any output ports. The space switch takes the outputs of the two input TSIs and switches them, without changing time slots, to create the streams A, F, H, D and A, B, C, E. Note that this involves a multicast of timeslot A to both outputs. Finally, the output TSIs reorder these streams to give the output streams H, D, F, A and E, A, B, C.

A three-stage T-S-T digital cross connect is logically equivalent to a 3-stage Clos network with P T×T input stages, T P×P middle stages, and P T×T output stages. To route a configuration of input time slots to output time slots on such a switch a middle-stage time slot must be assigned to each connection. This routing is described in detail in Clos, Charles, "A Study of Non-Blocking Switching Networks", Bell System Technical Journal, March 1953, pp. 406–424, and V. E. Benes, "On Rearrangeable Three-Stage Connecting Networks", The Bell System Technical Journal, vol. XLI, No. 5, Sep. 1962, pp. 1481–1492. These references show that a 3-stage Clos network, and hence a T-S-T digital cross connect, is rearrangeably non-blocking for unicast traffic but cannot, in general route multicast traffic.

A network is rearrangeably non-blocking, or rearrangeable, for unicast traffic, if for every input to output permutation, there exists an assignment of middle stage time slots that will route that permutation. A network is strictly non-blocking if an existing configuration can be augmented to handle any new connection between an idle input time slot and an idle output time slot without changing the time slots assigned to any existing connection.

From its input and output terminals, a rearrangeable network is indistinguishable from a strictly non-blocking network if its configuration changes are (1) aligned to the start of a frame and (2) frame synchronized so that all TSIs and space switches switch their configurations at the start of the same frame. Such frame synchronized switching is referred to as "hitless" because it does not hit or corrupt the contents of any frames. There is no impact of rearranging existing connections as long as such rearrangement is hitless. Thus, with hitless switching, there is little advantage to strictly non-blocking switches. Hitless switching is provided in Lucent 800 and 900 series digital cross connects (see www.chipcenter.com/telecommunications/mdp/webscan/mn00e/mn00e016.htm; and connectivity1.avaya.com/exchangemax/).

A grooming switch is a cross-connect switch that internally aggregates and segregates data for efficient traffic routing. Aggregation is the combining of traffic from different locations onto one facility. Segregation is the separation of traffic.

For instance, a SONET grooming switch having 72 STS-48 input and output ports with STS-1 granularity routes any of one of the 72×48=3,456 input STS-1 signals to any one of the 3,456 output STS-1s. Such a grooming switch is non-blocking for unicast traffic, where "blocking" occurs when an active input cannot be connected to an output.

Three-stage Clos networks are often used in building grooming switches in order to minimize the number of crosspoints. A symmetric three-stage Clos network, C(n, m, r), has r n×m input switches, m r×r middle-stage switches, and r m×n output switches. Clos networks can be recursive. That is, each switch in a Clos network can be either a single-stage non-blocking crossbar or a three-stage Clos network.

A Clos network with an internal switch core speed-up of two, i.e., where m=2n, supports strictly non-blocking unicast traffic and rearrangeably non-blocking dualcast traffic (See C. Clos, "A Study of Non-Blocking Switching Networks," Bell System Technical Journal, vol. 32, 406–424, 1953 and V. E. Benes, Mathematical Theory of Connecting Networks and Telephonic Traffic, New York: Academic Press, 1965, each of which is incorporated herein by reference.

FIG. 5 illustrates a TST (time-space-time) grooming switch 2 as a symmetric Clos network C(n, 2n, r), with the time-slot interchanges (TSIs) 4, 8 represented as horizontal planes and the time-multiplexed middle-stage crossbar 6 represented as vertical planes. Specifically, this TST grooming switch has r n×2n input TSIs 4, r 2n×n output TSIs 8, and an r×r 2n-time-multiplexed crossbar 6, where r is the number of ports and n is the number of time-slots per port.

For example, Velio Communications, Inc.'s VC2002 (tm) is a 72×72 time-space-time (TST) grooming switch, is implemented as a symmetric 3-stage Clos C(48, 96, 72) network with 72 input ports, 72 output ports, 48 time slots for each port, and 96 middle-stage time slots.

A general problem with TST switches is that they block arbitrary multicast traffic. On the other hand, a single-stage switch, effectively an nr×nr crossbar, is strictly non-blocking for arbitrary multicast traffic; that is, any available input can connect to any set of available outputs without disturbing existing connections. However, single-stage switches are expensive to implement.

SUMMARY OF THE INVENTION

According to an embodiment of the present invention, a grooming switch comprises plural input ports for receiving multi-time-slot, i.e., time-multiplexed, input signals and plural output ports for forwarding multi-time-slot output signals. At least five switching stages alternate between time switching and space switching. The first stage is connected to the input ports, and the last stage is connected to the output ports. Each intermediate stage is connected to two other stages. Collectively, these stages perform compact superconcentration of the input signals, copying and distribution of the compact superconcentrated signals, and unicast switching of the distributed signals to form the output signals, resulting in a grooming switch that is rearrangeably non-blocking for arbitrary multicast traffic.

Each particular stage comprises plural switches of the same type, i.e., space switch or timeslot interchange, cascaded together.

In a particular embodiment, each space switching stage comprises a crossbar switch, which may be time-multiplexed across multiple time slots. A switching stage comprises at least one switch, i.e., at least one space switch or time-slot interchange. For example, if there are two input ports, then the first stage will contain two time-slot interchanges.

At least one switch in a time switching stage is a time slot interchange, while at least one switch in a space switching stage is a space switch. Plural switches within a stage can be arranged either in parallel or in cascade, or both.

In at least one embodiment of the present invention, signals are according to SONET, for example, high-level STS-N signals with STS-1 granularity. In an alternate embodiment, signals are according to SDH, for example, high-level STM-N signals with STM-0 granularity.

In one embodiment, the number of time-slot interchanges is expanded internally to the switch, for example, by a factor of two.

In one embodiment, two 3-stage TST grooming switches are connected so that the last stage of one grooming switch is combined with the first stage of the other grooming switch. The two grooming switches can be distinct devices, or they can be different portions of a single device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 6:
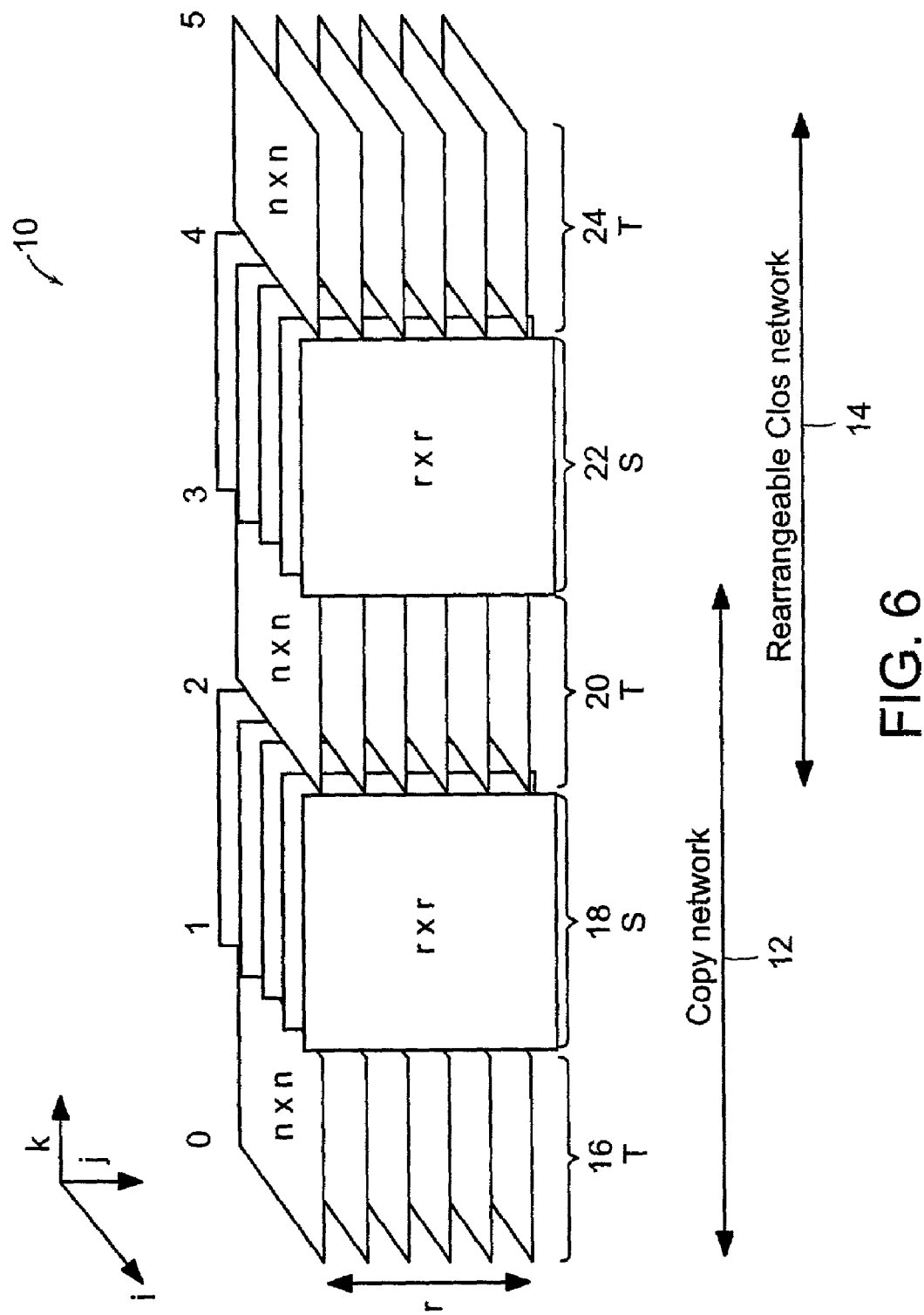
FIG. 6 is a schematic diagram of a TSTST grooming switch according to an embodiment of the present invention.

FIG. 6 illustrates a 5-stage TSTST network 10 that is rearrangeably non-blocking for arbitrary multicast traffic. This network 10 does not require any internal speed-up, i.e., internal expansion of the number of timeslots.

A TSTST network 10 conceptually consists of a copy network 12 and a rearrangeable TST Clos network 14. The middle or third stage 20, which is a time-slot interchange (TSI), serves both networks 12, 14. The copy network 12 concentrates and then copies active input STS-1s, as many times as there are fanouts, to the output of the middle TSI 20. As a result, the TST Clos network 14 (stages 3 to 5, i.e., references 20, 22 and 24) only needs to route unicast calls.

The TSTST architecture combines the low power consumption and high density of a multi-stage switch with the non-blocking routing of a single-stage architecture. A hardware scheduler performs fast reconfiguration and consists of a compact superconcentrator, a copy distributor, and a unicast scheduler.

TSTST Control Algorithm

The control algorithm employed by an embodiment of the present invention consists of three major steps: compact superconcentration; copy distribution; and rearrangeable unicast scheduling.

A superconcentrator maps a subset of inputs $A \subseteq I$ to a specified subset of outputs $B \subseteq O$. A set B of $\{0, 1, 2, \ldots, N-1\}$ is compact if the elements in B form a consecutive sequence modulo N, for instance, 6, 7, ..., N−1, 0, 1. A superconcentrator is compact if B is compact. See J. Y. Hui, Switching and Traffic Theory for Integrated Broadband Networks, Norwell: Kluwer Academic Publishers, 1990, incorporated herein by reference.

Each time slot in the TSTST switch can be viewed as a distinct input or output. A compact superconcentrator in the TSTST switch packs all active input time slots into a compact set of output time slots. Copies are then distributed according to each input's fanout.

The control algorithm shown below, written in pseudo-code, refers to the TSTST network of FIG. 6. The coordinate i represents time slots, j represents ports and k represents stages in the network. This algorithm realizes the compact supercompression and copy distribution steps, and is further discussed with respect to FIGS. 7A–7D.

```
// Compact superconcentration and copy distribution
// n = number of time slots
// r = number of ports
1.  i=0, i'=0, i''=0
2.  j=0, j'=0
3.  while (i < n and j < r){
4.    f = fanout of(i, j, 0)
5.    if (f> 0) {
        // compact superconcentration
6.      connect (i, j, 0) to (i', j, 1)
        // copy distribution
7.      connect (i', j, 1) to (i', j', 2)
8.      for f' = 0 ... f−1 {
9.        connect (i', j', 2) to (i'', j', 3)
10.       i'' = i'' + 1
11.       if (i'' == n) {
12.         i'' = 0, j' = j' + 1
13.         if (f' != f−1) {
14.           connect (i', j, 1) to (i', j', 2)
            }
          }
        }
      }
15.   i' = i' + 1
16.   if (i' == n) {i' = 0, j' = j' + 1}
    }
17.   i = i + 1
18.   if (i == n) {i = 0, j = j + 1}
    }
```

Figure 7A:
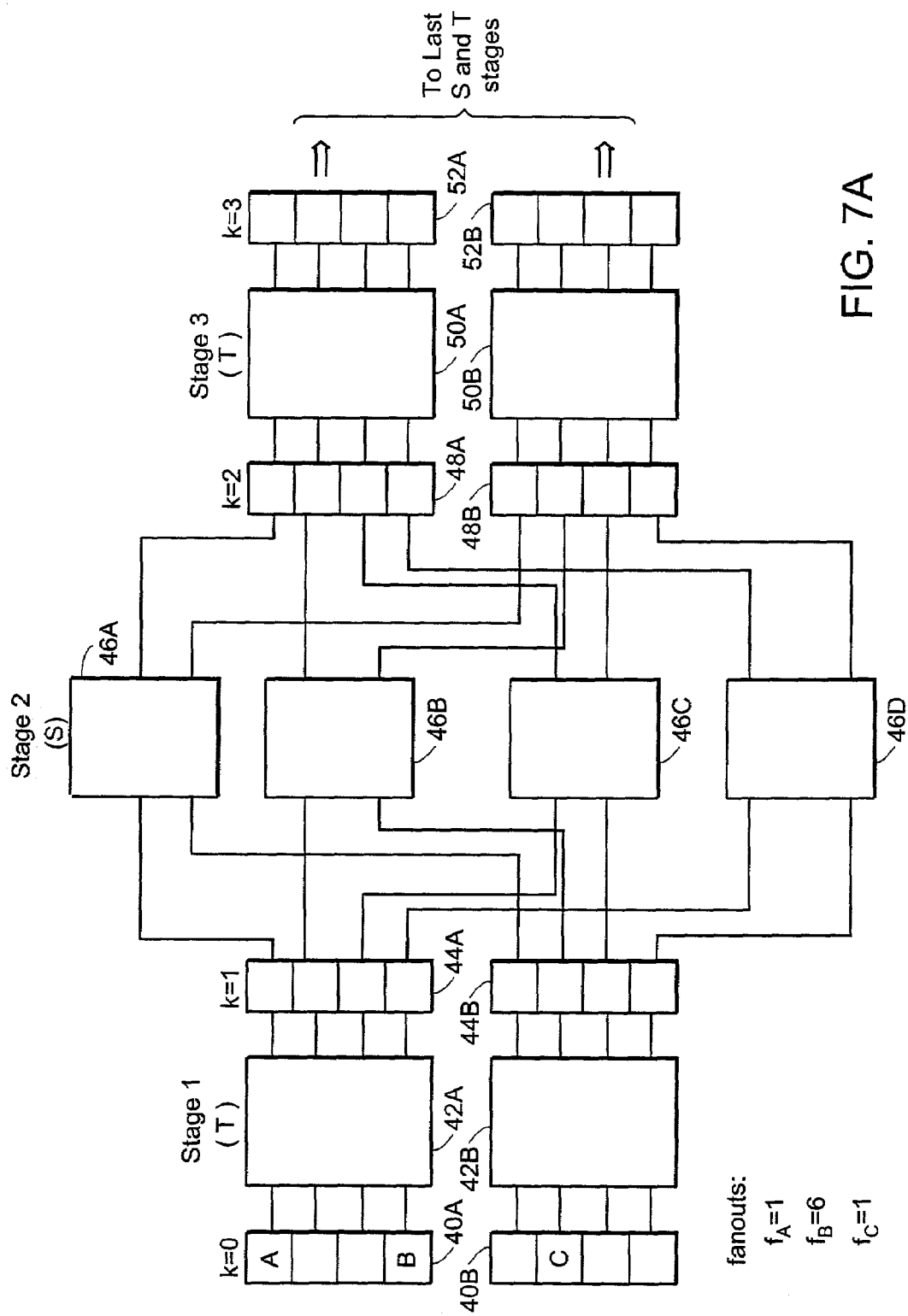
FIGS. 7A–7D are schematic diagrams, for illustrative purposes, of a simple grooming switch according to an embodiment of the present invention, illustrating the development of an internal routing configuration for three active inputs having various fanout requirements.

FIG. 7A illustrates, for exemplary purposes, the first three stages of a simple grooming switch according to an embodiment of the present invention. Assume that there are three active inputs: A, B and C, having fan outs $f_A=1$, $f_B=6$ and $f_C=1$ respectively. Before the execution of the above algorithm, the switch is unconfigured, as shown in FIG. 7A.

In this simple switch, there are two input ports 40A, 40B, represented at k=0. Each port 40A, 40B feeds a respective timeslot interchange 42A, 42B within stage 1. The output of stage 1 is represented at k=1.

The output 44A, 44B of stage 1 is then the input to stage 2. In this example, stage 2 comprises four space switches 46A–46D, which may in fact be a single multiplexed space switch. The outputs of the stage 2 switches are represented at k=2, 48A, 48B.

These outputs 48A, 48B in turn become the inputs to stage 3. Stage 3 comprises two timeslot interchanges 50A, 50B. The outputs of the timeslot interchanges 50A, 50B are represented at k=3 as 52A, 52B.

The active inputs A, B and C appear at the input ports 40A, 40B.

Figure 7B:
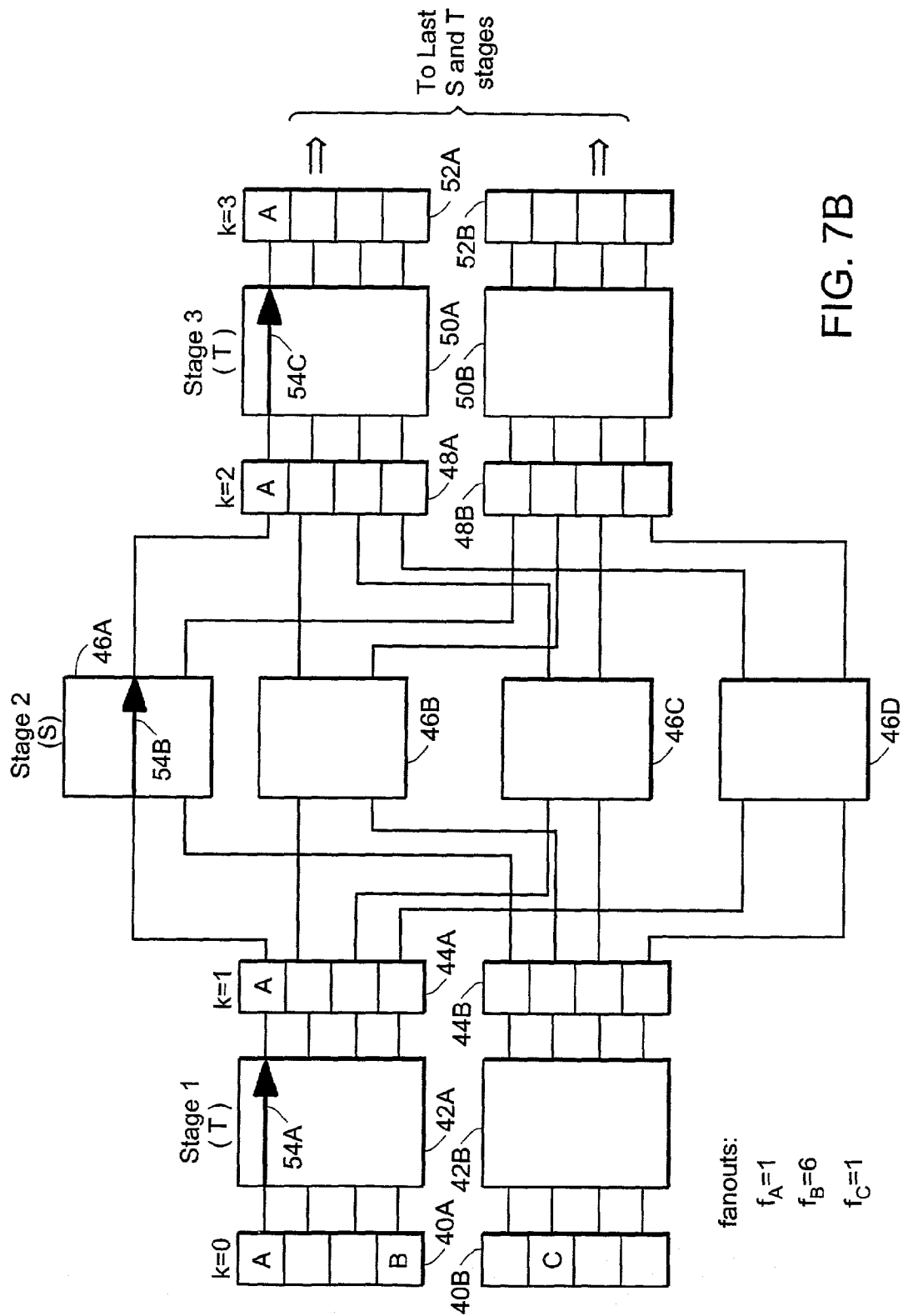

FIG. 7B illustrates the configuration of the switch after the algorithm has been applied to active input A. First, input A is routed 54A through the first stage timeslot interchange 42A (step 6 of the algorithm), routed 54B through the second stage space switch 46A (step 7), and finally routed 54C through the third stage timeslot 50A (step 9).

Figure 7C:
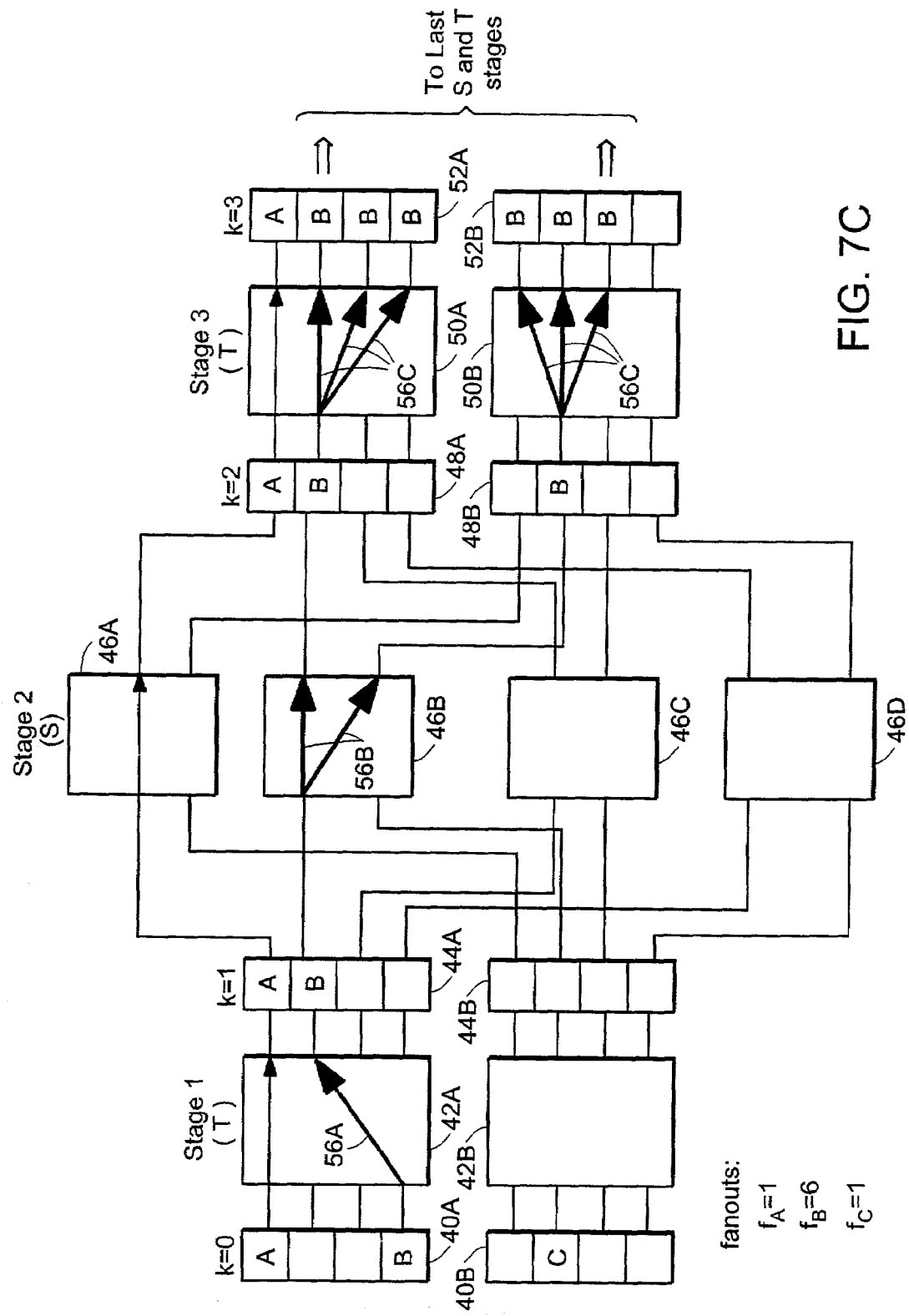

Similarly, FIG. 7C illustrates the configuration of the switch after the algorithm has been applied to active input B. First, input B is routed 56A through the first stage timeslot interchange 42A, such that at the output of stage 1 44A, the active inputs in a particular port are compact superconcentrated (step 6). At the second stage switch 56B, input B is copied 56B once for each port, as necessary (steps 9 and 14). Finally, at the third stage timeslot interchanges 50A, 50B, each copy of input B is distributed 56C as many times as necessitated by the requisite fanout (step 9).

Figure 7D:
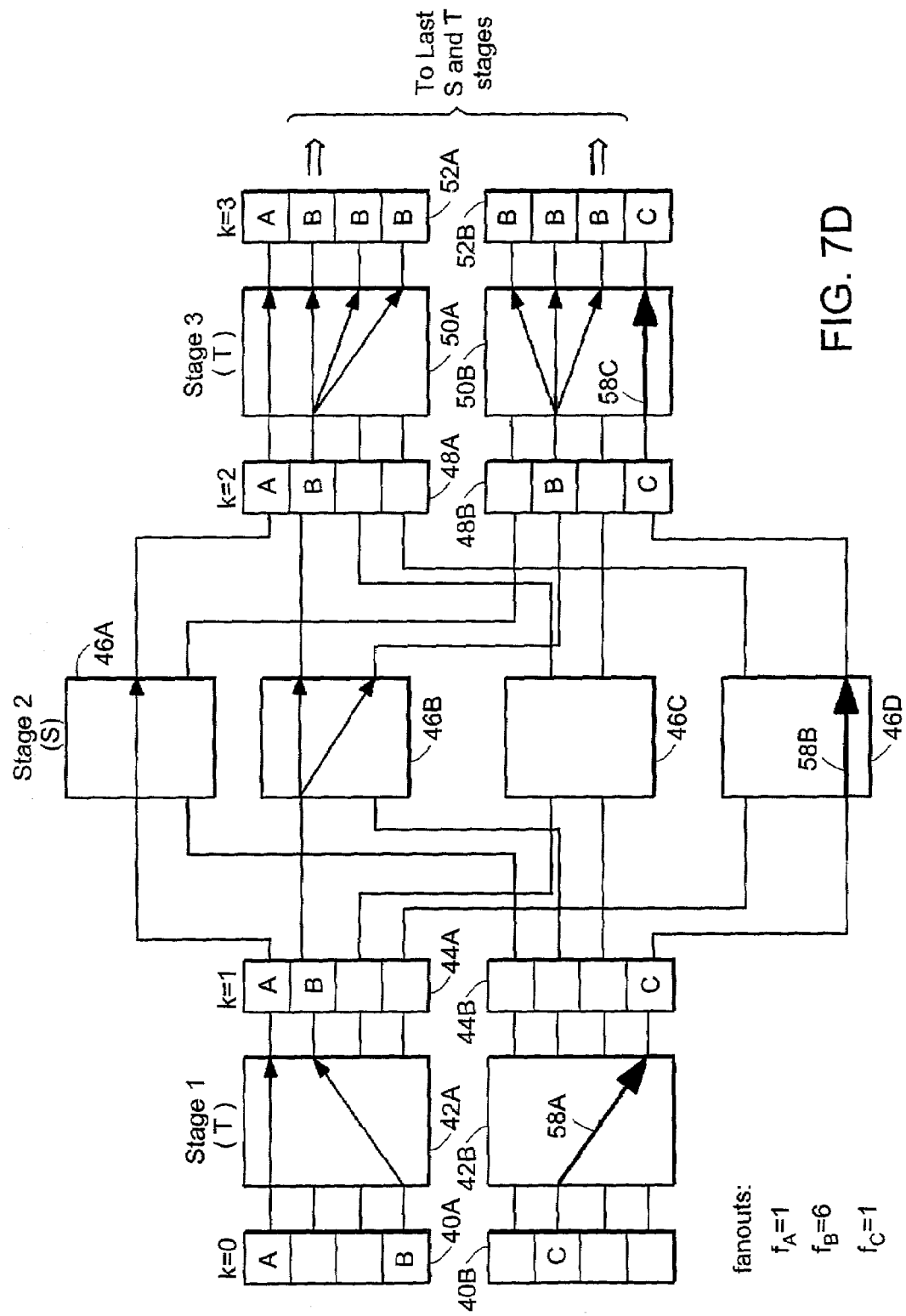

Finally, FIG. 7D illustrates the configuration of the switch after the algorithm has been applied to active input C. First, input A is routed 58A through the first stage timeslot interchange 42B (step 6), routed 58B through the second stage space switch 46D (step 7), and finally routed 58C through the third stage timeslot 50B (step 9).

In some implementations, the actual distribution of incoming calls (line 9) in the third stage is unnecessary because the third stage is both part of the copy network and the TST Clos network. For example, the calls at the input of the third stage can be tagged for the unicast scheduling algorithm.

The third part of the control algorithm, i.e., the looping algorithm, is described in V. E. Benes, Mathematical Theory of Connecting Networks and Telephonic Traffic, New York: Academic Press, 1965 and in J. Y. Hui, Switching and Traffic Theory for Integrated Broadband Networks, Norwell: Kluwer Academic Publishers, 1990, and is therefore not shown here. This algorithm guarantees non-blocking scheduling in a TST Clos network, C(n, n, r), by rearranging existing connections if necessary. The previously described steps of compact superconcentration and copy distribution distribute each multicast call as many times as its fanouts and transform the multicast routing problem into a unicast one.

Building Non-Blocking Grooming Switches with TST Grooming Switches

Figure 8:
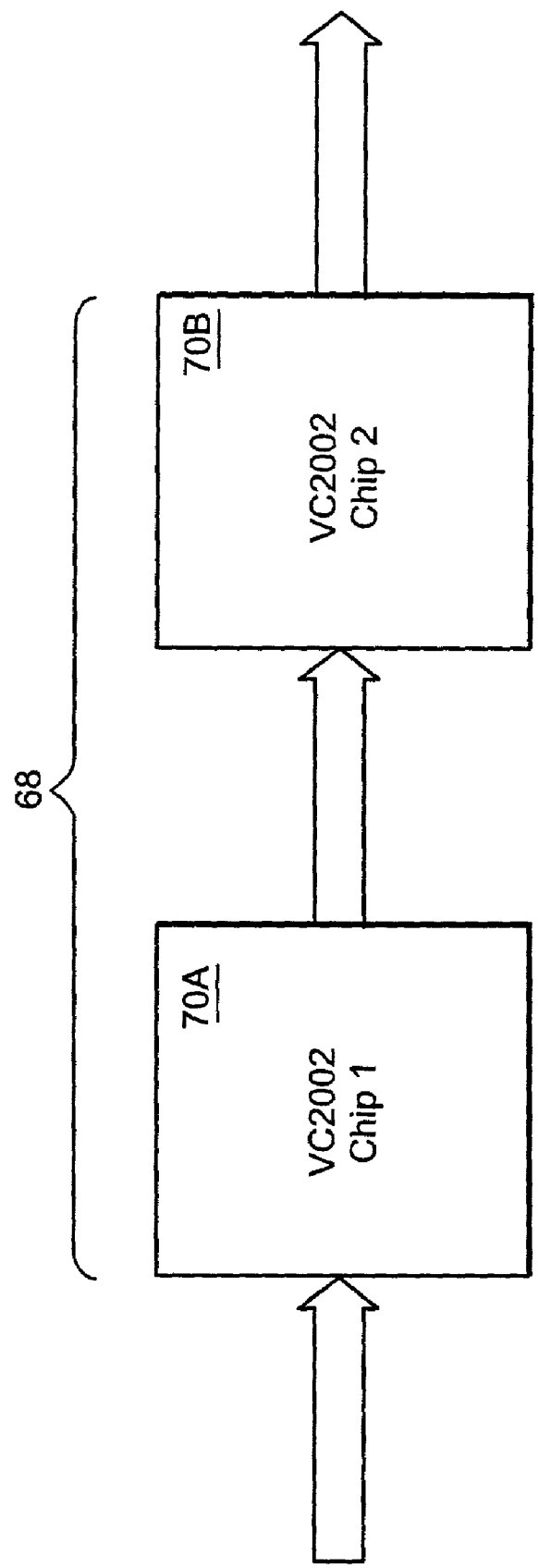
FIG. 8 is a block diagram illustrating a two-chip cascade embodiment of the present invention.

FIG. 8 illustrates a two-chip cascade solution for a multicast switch, using two time-space-time (TST) grooming switches 70, such as Velio Communications, Inc.'s VC2002 (tm). This two-chip network 68 is, in effect, a 5-stage TSTST network, with the output time switches of the first chip 70A and the input time switches of the second chip 70B combined into a single stage. The first- and second-stage switches by themselves are strictly non-blocking for multicast traffic. The remaining stages support unicast traffic.

Figure 9:
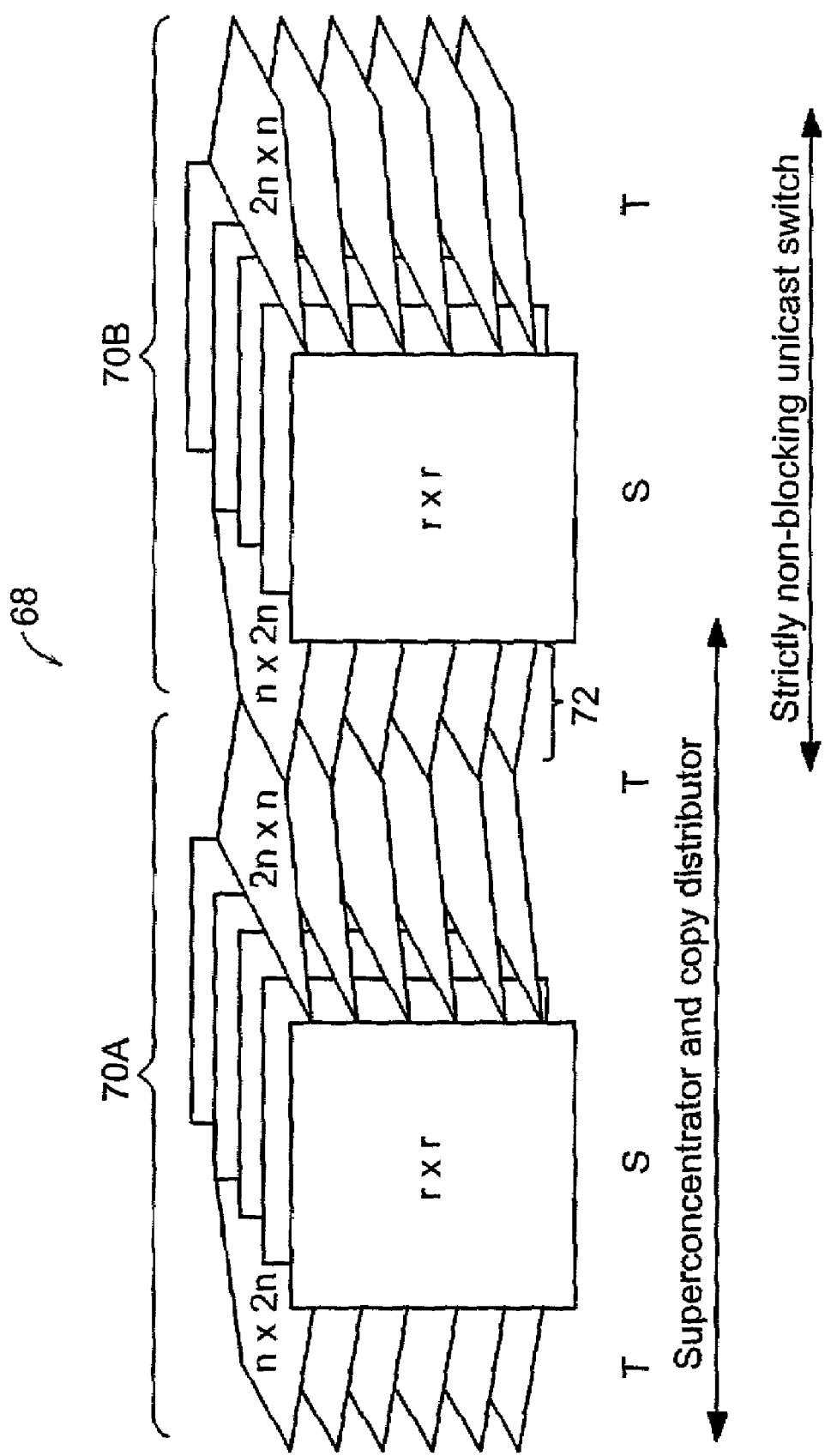
FIG. 9 is a schematic diagram of the two-chip cascade embodiment of FIG. 4.

FIG. 9 is a flattened view of the two-chip cascade multicast switch 68 of FIG. 8. Although each TST grooming switch 70 is rearrangeably non-blocking for dualcast traffic, the two-chip cascade solution 68 supports multicast because the first chip 70A and the first-stage TSIs 72 of the second chip 70B groom multicast calls using the control algorithm discussed previously. The second chip 70B then need only route unicast traffic. The VC2002 70B is strictly non-blocking for unicast traffic because there are more than 95, i.e., 2n−1, middle-stage time slots. Thus, the scheduling algorithm is straightforward.

Figure 1:
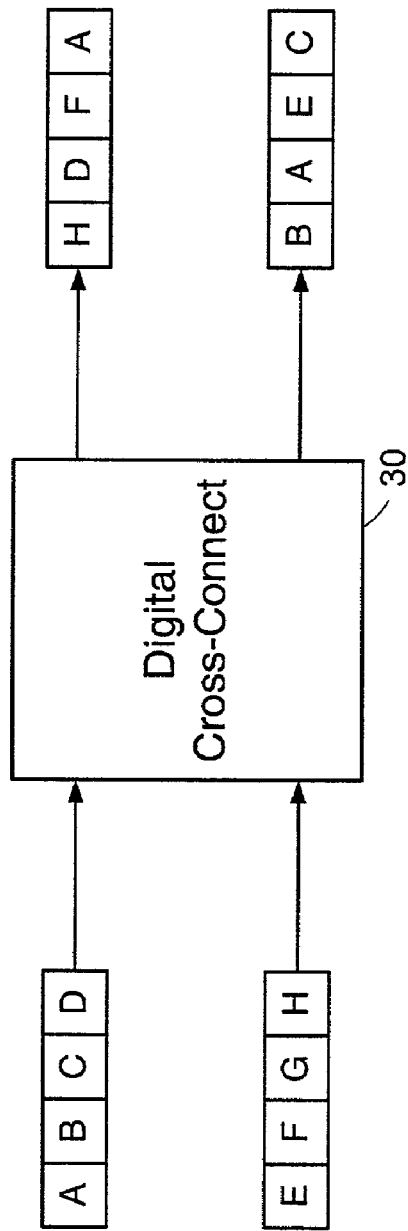
FIG. 1 illustrates operation of a prior art digital cross connect.
Figure 2:
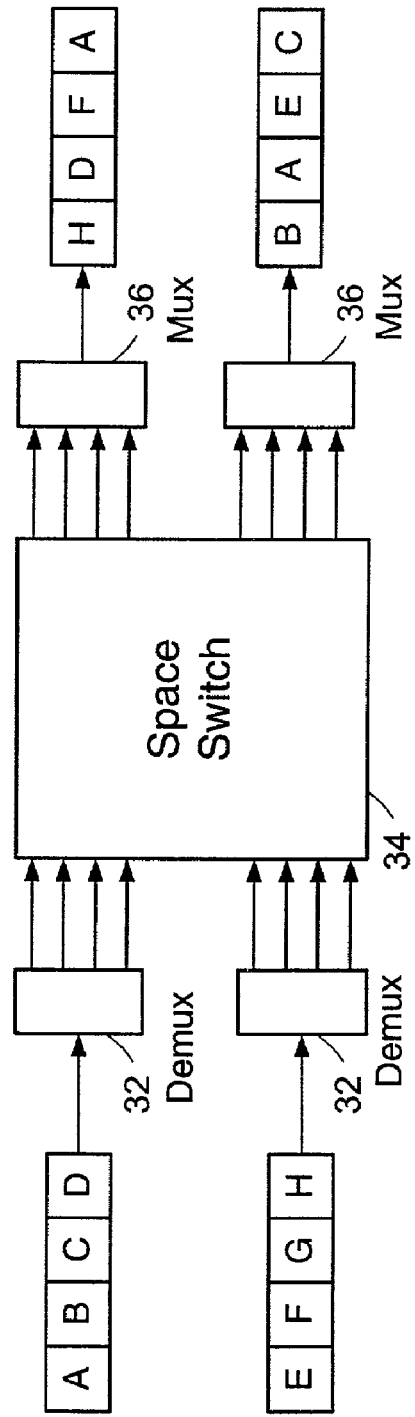
FIG. 2 illustrates a prior art digital cross connect with a space switch and multiplexers.
Figure 3:
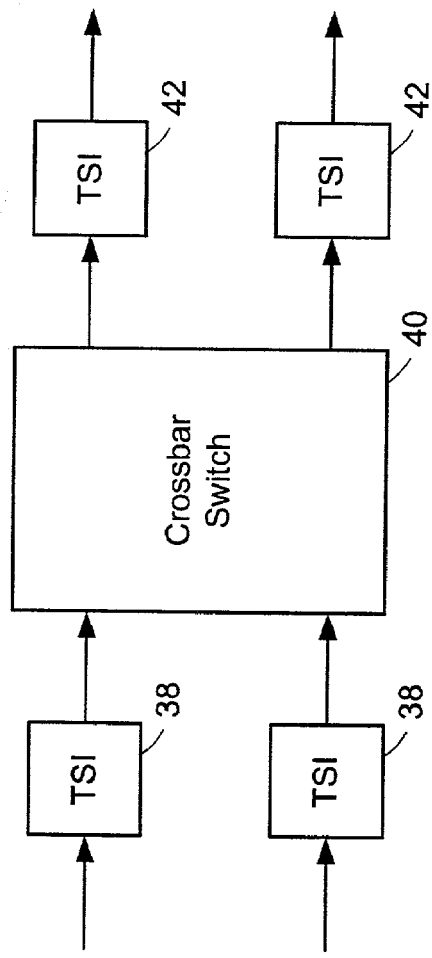
FIG. 3 illustrates a prior art digital cross connect using time-slot interchangers.
Figure 4:
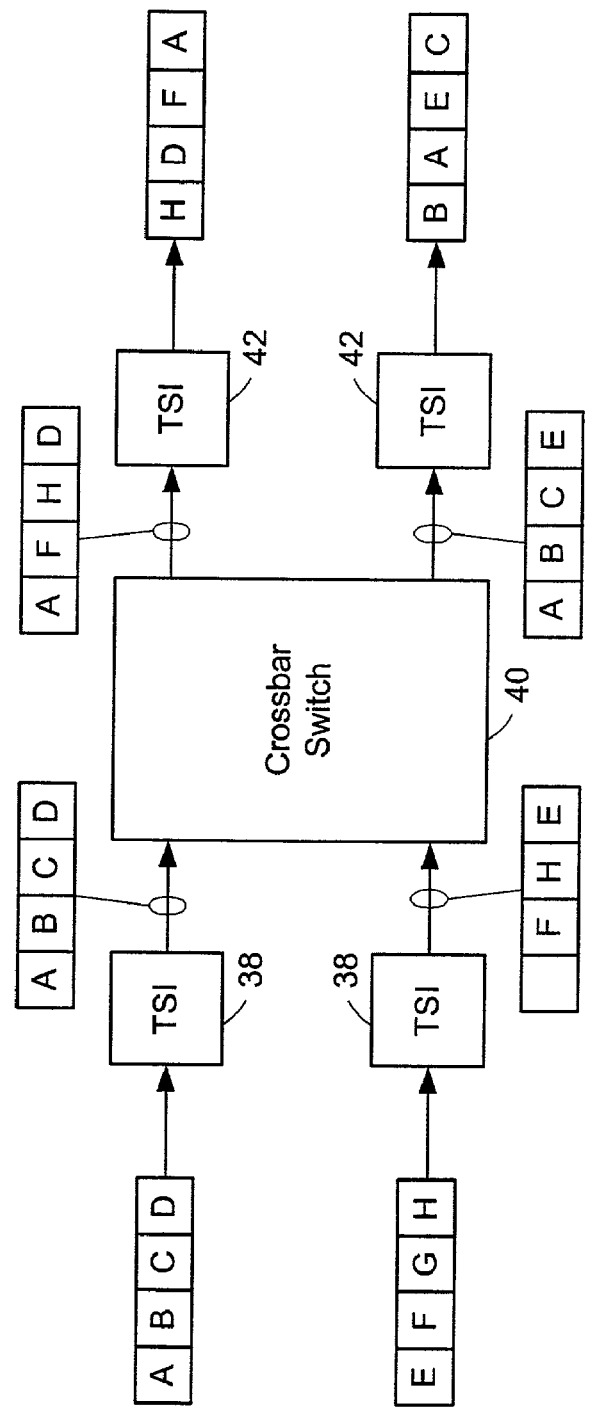
FIG. 4 illustrates operation of the digital cross connect of FIG. 3.
Figure 5:
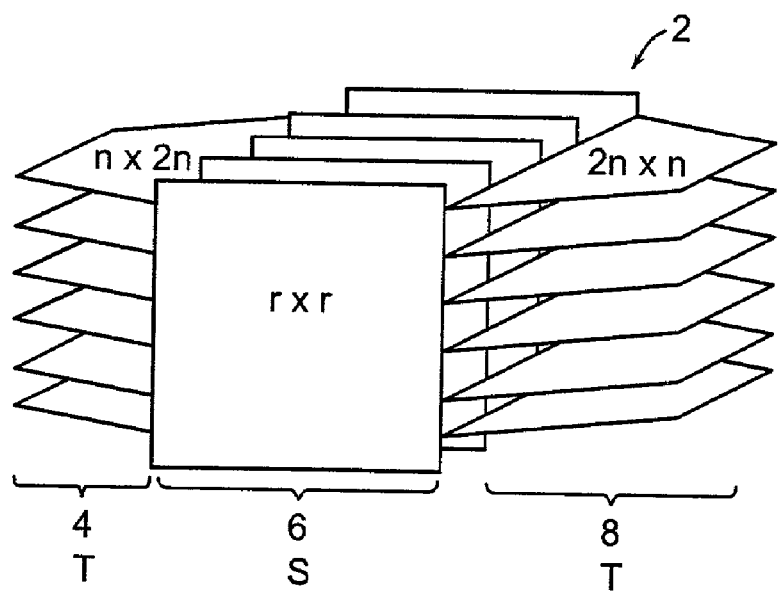
FIG. 5 is a schematic diagram illustrating a prior art TST grooming switch.
Figure 10:
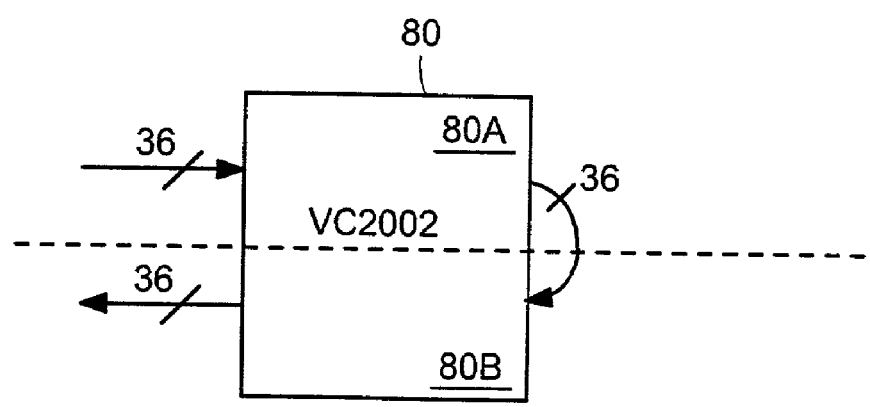
FIG. 10 is a block diagram of an alternative embodiment of the present invention realized with a single, logically dividable grooming switch.

Alternatively, as FIG. 10 illustrates, a single TST grooming switch 80, such as the VC2002, can be used to implement a smaller, non-blocking grooming switch such as a 36×36 rearrangeably non-blocking grooming switch, because the VC2002 supports dual alignment. Here, one half 80A of a TST switch comprising 36 transmitters is connected to the other half 80B of the switch comprising 36 receivers. To implement a 5-stage grooming switch, the upper half 80A and the lower half 80B of the TST switch 80 can use different frame alignment domains.

Building A Non-Blocking Grooming Switch with TST and Crosspoint Switches

The port count on crosspoint switches is typically twice that of grooming switches because crosspoint switches do not require TSIs. For instance, Velio Communications, Inc.'s VC3003 (tm) has 140 high-speed receivers and transmitters.

Figure 11:
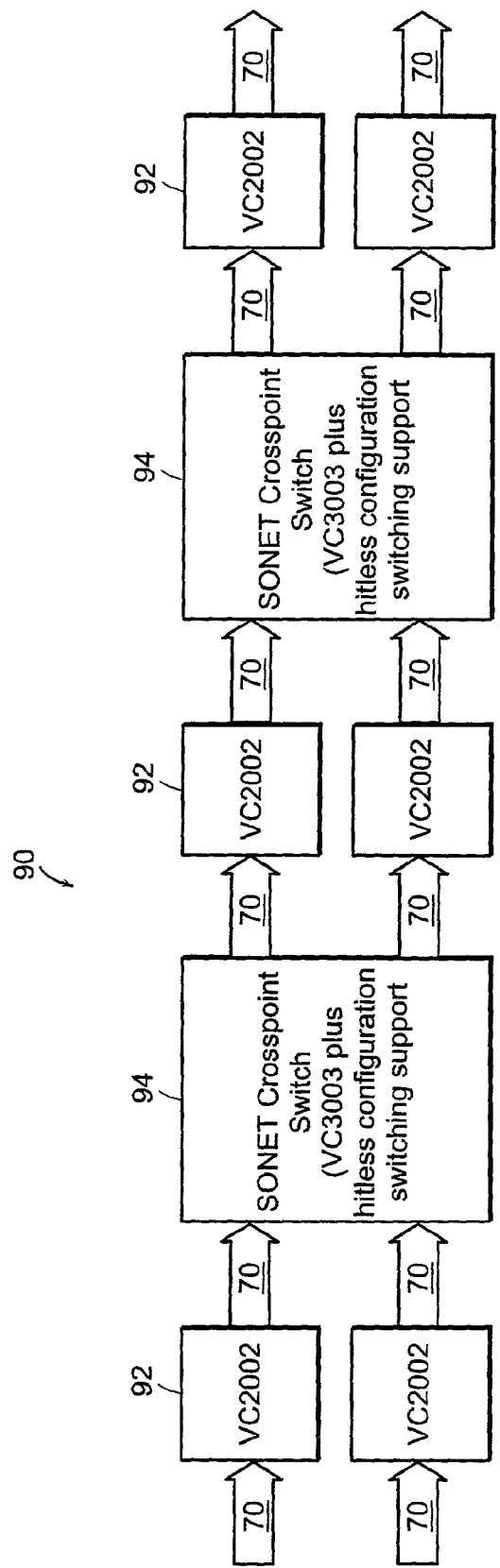
FIG. 11 is a block diagram of an eight-chip embodiment of the present invention.

FIG. 11 illustrates an implementation of a rearrangeably non-blocking multi-point network where a crosspoint switch such as the VC3003 with added support for SONET hitless configuration switching. Here, an eight-chip network 88, including six TST grooming switches 92 and two SONET crosspoint switches 94, is used to implement such a network. In the embodiment shown, each VC2002 92 is used only for its seventy TSIs and the entire network 90 thus comprises a TSTST switch. Of course, such an implementation is not limited to these specific components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A grooming switch comprising:
a plurality of switching stages arranged as (i) at least five sequential stages, (ii) alternating between time switching and space switching, (iii) a first of the switching stages connected to a plurality of input ports, (iv) a last of the switching stages connected to a plurality of output ports, and (v) a plurality of intermediate stages of the switching stages, wherein each of the intermediate stages connects to two other of the switching stages, the switching stages collectively performing:
(A) concentrating a plurality of input signals to generate a plurality of compact signals,
(B) copying the compact signals to generate a plurality of distributed signals, and
(C) unicast switching the distributed signals to generate a plurality of output signals, wherein the grooming switch is rearrangeably non-blocking for arbitrary multicast traffic within the input signals.

2. The grooming switch of claim 1, wherein each of the switching stages comprises a plurality of switches of a respective switch type operating in parallel to each other.

3. The grooming switch of claim 2, wherein the respective switch type comprises a space switch.

4. The grooming switch of claim 2, wherein the respective switch type comprises a time slot interchange.

5. The grooming switch of claim 1, wherein one or more of the switching stages comprises a crossbar switch.

6. The grooming switch of claim 5, wherein each of the crossbar switches is time-multiplexed across multiple compact time slots of the compact signals.

7. The grooming switch of claim 1, wherein one or more of the switching stages comprises a plurality of switches.

8. The grooming switch of claim 7, wherein each of the switches in a time switching stage of the switching stages comprises a time slot interchange.

9. The grooming switch of claim 7, wherein each of the switches in a space switching stage of the switching stages comprises a space switch.

10. The grooming switch of claim 7, wherein the switches within a particular stage of the switching stages are arranged in parallel.

11. The grooming switch of claim 1, wherein the input signals are according to SONET.

12. The grooming switch of claim 11, wherein the input signals are high-level STS-N signals with STS-1 granularity.

13. The grooming switch of claim 1, wherein the input signals are according to SDH.

14. The grooming switch of claim 13, wherein the input signals are high-level STM-N signals with STM-0 granularity.

15. The grooming switch of claim 1, wherein the switching stages are arranged as (i) a first time-space-time grooming switch and (ii) a second time-space-time grooming switch connected so that a last stage of the first time-space-time grooming switch is combined with a first stage of the second time-space-time grooming switch.

16. The grooming switch of claim 1, wherein the switching stages are arranged as (i) a first time-space-time grooming switch and (ii) a second time-space-time grooming switch connected as distinct devices.

17. The grooming switch of claim 1, wherein the switching stages are arranged as (i) a first time-space-time grooming switch and (ii) a second time-space-time grooming switch comprising different portions of a single device.

18. The grooming switch of claim 1, wherein a second of the at least five sequential stages comprises a plurality of space switches.

19. The grooming switch of claim 1, wherein a second of the at least five sequential stages comprises a multiplexed space switch.

20. The grooming switch of claim 1, wherein the at least five sequential stages comprises a time-space-time-space-time sequence of stages.

21. The grooming switch of claim 1, wherein the at least five sequential stages comprises a time-space-time-time-space-time sequence of stages.

22. A method for routing packets through a grooming switch, comprising the steps of:
(A) for each of a plurality of input ports, concentrating a plurality of input signals in a first timeslot interchange of a plurality of switching stages arranged as at least five sequential stages to generate a plurality of compact signals;
(B) copying the compact signals to generate a plurality of distributed signals, the copying using both (i) a first space switch of the switching stages and ii a second timeslot interchange of the switching stages according to one or more fanout criteria of the input signals; and
(C) unicast switching the distributed signals to generate a plurality of output signals, the unicast switching using both (i) a second space switch of the switching stages and (ii) a third timeslot interchange of the switching stages according to one or more routing criteria of the input signals, wherein each of the output signals has multiple output time slots.

23. The method of claim 22, wherein the steps of copying and unicast switching use a common timeslot interchange of the switching stages.

24. The method of claim 22, wherein each of the switching stages comprises a plurality of switches of a respective switch type operating in parallel to each other.

25. The method of claim 24, wherein the respective switch type comprises a space switch.

26. The method of claim 24, wherein the respective switch type comprises a time slot interchange.

27. The method of claim 22, wherein one or more of the switching stages comprises a crossbar switch.

28. The method of claim 27, wherein each of the crossbar switches is time-multiplexed across multiple compact time slots of the compact signals.

29. The method of claim 22, wherein one or more of the switching stages comprises a plurality of switches.

30. The method of claim 29, wherein each of the switches in a time switching stage of the switching stages comprises a time slot interchange.

31. The method of claim 29, wherein each of the switches in a space switching stage of the switching stages comprises a space switch.

32. The method of claim 29, wherein the switches within a particular stage of the switching stages are arranged in parallel.

33. The method of claim 32, wherein the input signals are high-level STS-N signals with STS-1 granularity.

34. The method of claim 22, wherein the input signals are according to SONET.

35. The method of claim 22, wherein the input signals are according to SDH.

36. The method of claim 35, wherein the input signals are high-level STM-N signals with STM-0 granularity.

37. The method of claim 22, wherein the switching stages are arranged as (i) a first time-space-time grooming switch and (ii) a second time-space-time grooming switch connected so that a last stage of the first time-space-time grooming switch is combined with a first stage of the second time-space-time grooming switch.

38. The method of claim 22, wherein the copying comprises the sub-step of time-slot interchanging.

39. The method of claim 22, wherein the copying comprises the sub-step of space switching.

40. The method of claim 39, wherein the copying further comprises the sub-step of time-slot interchanging at least one copy generated by the space switching.

41. A grooming switch comprising:
in each of a plurality of input ports, means for concentrating the input signals in a first timeslot interchange of a plurality of switching stages arranged as at least five sequential stages to generate a plurality of compact signals;
means for copying the compact signals to generate a plurality of distributed signals, the copying using both (i) a first space switch of the switching stages and (ii) a second timeslot interchange of the switching stages and according to fanout criteria of the input signals; and
means for unicast switching the distributed signals to generate a plurality of output signals, the unicast switching using both (i) a second space switch of the switching stages and (ii) a third timeslot interchange of the switching stages according to one or more routing criteria of the input signals, wherein each of the output signals has multiple output time slots.

* * * * *